Aug. 12, 1952  A. HOWARD  2,606,741
GAS TURBINE NOZZLE AND BUCKET SHROUD STRUCTURE
Original Filed June 11, 1947
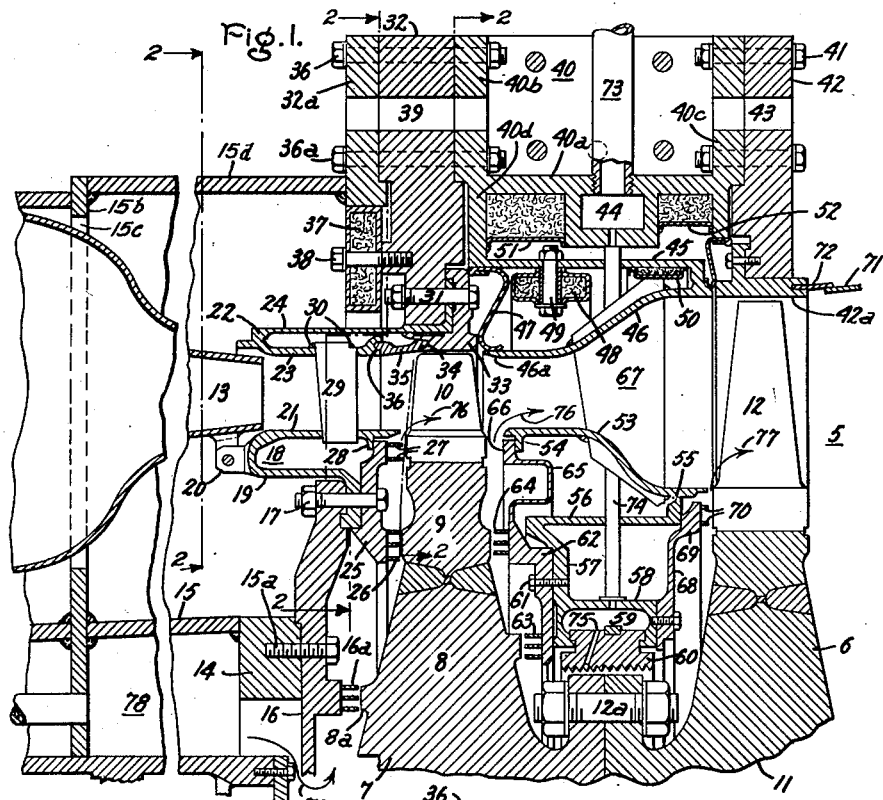
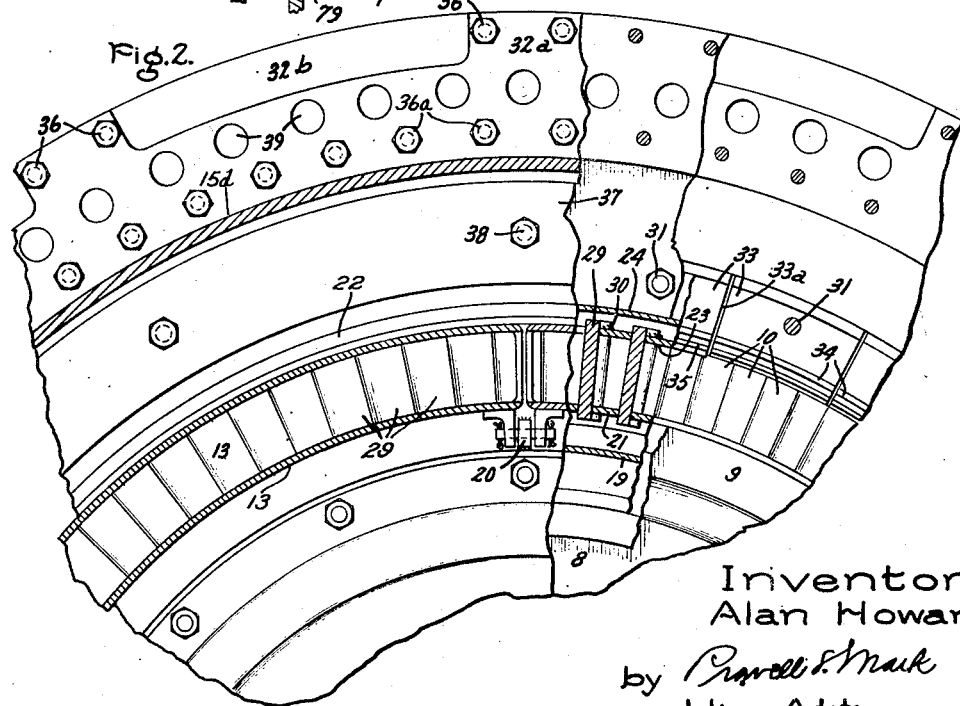
Inventor:
Alan Howard,
by *Prowell E. Mark*
His Attorney.

Patented Aug. 12, 1952

2,606,741

UNITED STATES PATENT OFFICE 2,606,741

GAS TURBINE NOZZLE AND BUCKET SHROUD STRUCTURE

Alan Howard, Schenectady, N. Y., assignor to General Electric Company, a corporation of New York Original application June 11, 1947, Serial No. 754,002. Divided and this application July 28, 1949, Serial No. 107,306

4 Claims. (Cl. 253—39.15)

This invention relates to gas turbines and more particularly to the nozzle and bucket shroud structure thereof.

This is a division of application Serial Number 754,002 filed June 11, 1947 in the names of Alan Howard, Chester S. Rice and Bruce O. Buckland and assigned to the same assignee as the present application.

In the design of gas turbine powerplants, a major consideration is the provision of arrangements for permitting free differential thermal expansion between relative parts without producing undesirable deformation of the rotor or material alteration of the clearances between the rotor and various stationary parts. Because of the extremely high temperatures to which certain parts must necessarily be subjected, it is necessary to use special high temperature resisting materials, such as various stainless steels. These generally have a coefficient of expansion in the neighborhood of twice that of ordinary mild steel, with the result that utilization of such materials magnifies the problems resulting from differential thermal expansion. Furthermore, in a powerplant designed for applications where the load must be frequently and materially altered, as for instance in marine installations and locomotives, it is found that differential thermal expansion problems are intensified still further by differences in the size and mass of various related parts and differences in the resistance of the heat flow paths to them from the source of heat, with accompanying differences in the rate of change of dimension when temperatures change rapidly.

An object is to provide an improved nozzle structure for a gas turbine powerplant, capable of operation at high, rapidly changing temperatures without transfer of excessive heat or distorting forces to associated parts.

A further object is to provide an improved stationary shroud arrangement for turbine buckets of the open or shroudless type.

Other objects and advantages will be apparent from the following description taken in connection with the accompanying drawings, in which Fig. 1 is an enlarged sectional view of the turbine nozzle structure, bucket wheels, interstage diaphragm, and outer turbine casing; and Fig. 2 is a sectional view broken away along the irregular plane 2—2—2 in Fig. 1.

Referring now to Fig. 1, a gas turbine 5 includes a rotor 6, having a first stage turbine bucket-wheel, indicated generally at 7, which in turn has a hub portion which may be connected by any one of several means to a compressor (not shown). The hub portion of wheel 7 has a first radially extending web portion 8, to which is welded a circumferential rim portion 9, which in turn carries a circumferential row of buckets 10. These buckets may be secured to rim 9 by any suitable means, such as dove-tails, welding etc. It will be noted that the buckets 10 are of the "shroudless" or open-ended type. This construction is what has come to be known as a "composite bucketwheel," which is more fully described and claimed in an application, Serial No. 498,643, filed August 14, 1943, in the name of Alan Howard, now Patent 2,432,315, issued December 9, 1947. This construction is characterized by the fact that the central web portion 8 may be readily forged of ordinary mild steel, while the rim portion 9 is fabricated separately of a high temperature resistant material, such as an austenitic steel.

A second-stage turbine bucket-wheel, indicated generally at 11 and secured to wheel 7 by means of a circumferential row of bolts 12a projecting through cooperating flanges formed integral with the bucket-wheels, is also of the composite type and carries a circumferential row of shroudless second-stage buckets 12.

Hot motive fluid received from combustor discharge sections 13 is delivered to the buckets 10 of the first stage wheel 7 by means of a nozzle ring assembly, supported at its inner periphery by means of a heavy flange member 14 secured to the end of an axially extending cylinder 15 which in turn forms an integral part of the main turbine frame structure. Secured to flange 14 by a plurality of threaded fastenings 15a is an annular nozzle support plate 16. Secured by bolts 17 to the outer circumference of nozzle support plate 16 is a convoluted ring indicated generally at 18 which has an inner portion 19 extending axially to the left, an intermediate radially extending portion to which combustor discharge support lugs 20 are welded, and an outer wall 21 extending axially to the right toward the turbine bucket-wheel and forming the inner surface of the nozzle flow path. The outer flow path of the nozzle ring assembly is formed by a second convoluted member 22, including an inner wall 23 welded to, or formed integral with, an outer axially extending wall 24. It will be apparent that the intermediate portion of the convoluted rings 18 and 22 define an annular opening into which freely projects the discharge portions of the combustor transition sections 13. It should also be noted that the ring portions 19, 24 are comparatively wide in an axial direction and are sufficiently thin to have appreciable flexibility in a radial direction. Because they are thin, they present a minimum flow path for the conduction of heat from the hot nozzle assembly to the related comparatively cooler supporting structures.

The bolts 17 also serve to support a packing ring assembly including an annular plate 25 having at its inner periphery several concentric packing rings 26 projecting axially and forming close clearances with the adjacent rim portion 9 of bucket-wheel 7. At its outer periphery, plate 25 carries additional packing rings 27. The outer periphery of plate 25 also forms a radially slidable joint with an annular flange 28 at the end of wall 21. As noted above, the convoluted ring 18 has appreciable flexibility in a radial direction so that the nozzle may expand and contract readily relative to the support plate 16 and the sealing ring plate 25. To this end a generous radial clearance space is provided between the periphery of plate 25 and the inner circumferential surface of wall 21. The area of contact between flange 28 and the periphery of plate 25 is kept to a minimum so as to reduce the flow of heat by conduction therebetween.

An additional set of sealing rings 16a are secured to the nozzle support plate 16 and cooperate with an axially projecting boss 8a on the adjacent web portion of bucket-wheel 7. The provision of the projecting annular boss 8a has the advantage that in the event of accidental rubbing between packing rings 16a and the bucket-wheel, the boss 8a may be scored without seriously weakening the web of the turbine wheel. As will be understood by those skilled in the art, any small scratch or groove in the surface of a highly stressed rotor constitutes a "stress raiser" which may rapidly lead to failure of the rotor member. A boss such as that shown at 8a effectively prevents weakening of the bucket-wheel web 8 by any grooves cut by the sealing rings 16a. This packing ring arrangement is more fully disclosed in United States Patent 2,564,503, issued August 14, 1951, in the name of Chester S. Rice and assigned to the same assignee as the present application.

Secured in the inner and outer nozzle ring walls 21, 23 are a plurality of radially extending circumferentially spaced nozzle blades 29. These blades project through suitably shaped openings in both the outer wall 23 and the inner wall 21, but are welded only at the outside of the wall 23, as indicated at 30. The radially inner ends of blade 29 are free to slide in and out of the slots in wall 21 through which they project. Thus the inner and outer nozzle walls may freely expand and contract relative to each other without imposing buckling stresses on the comparatively thin blades 29. Conversely, the comparatively thin blades 29, which heat more rapidly than the walls 21, 23 when suddenly subjected to hot motive fluid, may expand and contract freely.

At its right-hand edge, the outer nozzle support ring 24 is provided with a radially extending flange secured by bolts 31 to the inner periphery of a main support ring 32. Also secured by bolts 31 is a shroud member 33. This is not a solid ring but is made up of a plurality of segments, as may be seen better in Fig. 2. Each segment is held by one bolt 31, and is so dimensioned as to form an appreciable clearance space 33a with adjacent segments when cold. At operating temperatures, this clearance space 33a substantially closes up so that together the blocks 33 form a continuous annular shroud for the open-ended or shroudless buckets 10. At the inlet side, each shroud block 33 is provided with a groove shown at 34 in Fig. 1 and adapted to pivotally receive one edge of a bridge member 35. Member 35 is not a continuous annular ring but is also made up of a plurality of segments, each corresponding in circumferential length to that of the segmental shroud blocks 33. At their inlet edges, bridge segments 35 are provided with a second portion adapted to be pivotally received in a groove 36 formed in the adjacent end face of the outer nozzle wall 23. With this arrangement, the nozzle wall 23 may freely expand and contract radially relative to the comparatively cooler shroud segments 33, during which movement the bridge members 35 rotate slightly while preserving a substantially continuous wall for the flow of fluid from the nozzles to the turbine buckets.

To further minimize the flow of heat from the hot nozzle ring assembly to the comparatively cooler main frame rings 32 and 32a, the latter of which is secured by bolts 36 to ring 32, suitable heat insulating lagging is provided. This may be in the form of an annular box 37 fabricated of sheet metal and containing suitable insulating material such as asbestos or magnesia. Box 37 may be secured to the main frame ring 32 by means of bolts 38.

In addition to the bolts 36, the main frame rings 32, 32a are clamped together by an inner row of bolts 36a. Intermediate these two circumferential rows of bolts are a plurality of spaced cooling air holes 39. It may be noted that main frame plate 32a is cut away or scalloped as indicated at 32b in Fig. 2 so as to provide radially extending projections through which the bolts 36 pass. On the other hand, the main frame ring 32 has a smooth circular outer circumference. The scallops 32b are provided merely for weight saving.

The main frame ring 32a is supported in fixed relation to the inner frame cylinder 15 by an axially extending member 15d welded to a radially extending plate 15b. Plate 15b has a plurality of circumferentially spaced openings 15c, through which the respective combustor transition sections 13 project.

The entire design of this nozzle ring and shroud assembly is carefully arranged to reduce the transfer of heat from the hot parts to the cool frame members 32, 32a, etc. It will be observed that the convoluted ring 22 presents a comparatively long path for conduction of heat from the nozzle ring to the support member 32, and this flow path is of high resistance because of the small cross-section area of wall 24. The heat insulating box 37 also prevents radiation from the hot nozzle ring assembly to the cool rings 32, 32a. Care is taken throughout that metal-to-metal contacts between adjacent parts are kept to a minimum so as to limit the conduction of heat. With the arrangement described, the nozzle blades and walls heat very rapidly when subjected to hot motive fluid and are maintained continuously at a high temperature, being permitted to freely expand and contract relative to the comparatively cooler adjacent supporting members as the temperature of the motive fluid varies.

When shroudless turbine-buckets, such as those shown at 10, are used, it is essential to the efficiency of the turbine that the radial clearance space between the bucket tips and the adjacent stationary shroud 33 be maintained at a preselected small value, which however may not decrease below a certain minimum value if mechanical interference between buckets and shroud is to be prevented. This problem of maintaining proper bucket-to-shroud clearances becomes almost impossible to solve if both the bucket-wheel and the shroud are caused to change dimensions rapidly, but at differing rates, as the temperature of the motive fluid varies. The present arrangement facilitates the maintenance of proper clearances by the provision of the main frame ring 32 which is carefully cooled and arranged so that its temperature does not vary sufficiently to materially alter its radial dimensions. The shroud segments 33, which are in direct contact with the motive fluid, are permitted to freely expand and contract circumferentially by reason of the clearance spaces 33a as shown in Fig. 2, with the result that the inner diameter of the shroud ring formed by the segments 33 remains substantially constant. Thus the bucket-wheel can be so designed that when it rises to operating temperature, a safe, minimum clearance space between bucket tips and shroud will result.

As shown in Fig. 1, an interstage casing 40 is made in two halves bolted together on a vertical plane through the axis of the powerplant. This casing is channel-shaped in cross-section, having a cylindrical wall 40a and radially extending flanges 40b and 40c adapted to be secured by bolts 36 to main frame ring 32 and by bolts 41 to a second frame ring 42. Ring 42 is provided with a series of circumferentially spaced cooling air holes 43 arranged similarly to the holes 39 in frame ring 32. Though not material to an understanding of the present invention, the cooling system serviced by holes 39 and 43 is more particularly described in application Serial Number 754,002 filed June 11, 1947, in the names of Alan Howard, Chester S. Rice and Bruce O. Buckland and assigned to the same assignee as the present application.

Projecting radially inward from the casing wall 40a are walls defining an annular cooling air chamber 44. Projecting inwardly as a continuation of flange 40b, is an annular wall 40d which at its inner periphery is secured to an axially extending wall 45. This is of thin section so as to have some flexibility in a radial direction and to provide a minimum flow path for the conduction of heat from the interstage nozzle assembly. At its right-hand edge, ring 45 has an inwardly projecting portion secured to the adjacent edge of the outer wall 46 of the motive flow path. Wall 46 extends axially with its free edge 46a forming a small clearance space with the adjacent faces of shroud segments 33. This clearance space may be conveniently closed by a resilient sheet metal ring, S-shaped in cross-section, as indicated at 47. The radially outer portion of ring 47 may be secured by suitable means, for instance a few tack welds, to the inner circumference of wall 40d. Because of the reverse curvature of ring 47 and the fact that it is fabricated of comparatively light gage sheet metal, it will resiliently seal the space between the wall 46a and shroud segments 33, while permitting relative thermal expansion therebetween.

It will be observed that the comparatively thin flexible walls 45, 46 form a convoluted ring quite similar in arrangement and purpose to the rings 18, 22 of the first-stage nozzle assembly. To further limit the transfer of heat from the hot interstage nozzle assembly to the cooler casing 40, an annular fabricated sheet metal box 48 filled with heat insulating material may be secured by bolts 49 to wall 45. Similar insulation filled spaces are provided by sheet metal rings 50, 51, and 52, which may be secured in place by suitable threaded fastenings or tack welds.

The inner wall of the motive flow path is formed by an annular wall 53, which at its left-hand edge is provided with an inwardly extending flange 54 and at its right-hand edge is provided with a second inwardly extending portion 55. Secured to wall portion 55 is an axially extending wall 56 which is thin enough in section to be somewhat flexible and to present a high resistance heat flow path. Secured to wall 56 is an inwardly extending wall 57 which carries a casing 58 defining an annular cooling air passage 59 and serving to support a labyrinth type packing member 60. As will be obvious from Fig. 1, the labyrinth seal member 60 cooperates with the outer circumference of the bolting flanges through which project the turbine coupling bolts 12a. As shown in the drawings, packing member 60 is intended to represent a well-known type of packing, many various forms of which are familiar to those acquainted with the conventional steam turbine art. Secured to wall 57 by screws 61 is a sealing plate member 62 which supports two sets of packing rings 63, 64 similar in construction and purpose to the rings 16a, 26. Secured to the outer circumference of member 62 is an annular thin-walled reversely curved member 65 having an outer circumferential portion 66. Ring 66 is in slidable engagement with the side wall of flange 54, and forms a radial clearance space with the inner surface of wall 53. Thus the member 65 effectively seals the space within wall 53 while permitting radial thermal expansion of the free left-hand edge of wall 53. Wall 53 and the above-described parts associated with it are supported from the outer flow path wall 46 by means of the radially extending diaphragm blades 67. Because of the comparatively lower temperature of the motive fluid in this interstage passage, blades 67 may be welded both to the outer wall 46 and the inner wall 53 as shown in Fig. 1; alternatively, only the inlet portions of the blades may be welded to the walls 53, 46, the thin discharge portions of the blades being left free to expand without buckling. Bolted to the right-hand side of casing 58 is an outwardly extending annular sealing plate 68 having a circumferential portion 69 carrying packing rings 70 which form a close clearance with the adjacent rim portion of bucket-wheel 11. Ring 69 is in radially slidable sealing engagement with wall portion 55 so that wall portion 55 is completely free to expand and contract radially relative to the casing 58 and related parts.

As also shown in Fig. 1, main frame ring 42 supports a shroud 42a which is similar in arrangement and function to the segmental shroud 33 associated with the first turbine stage. At the left-hand edge of shroud 42a, the clearance space with nozzle walls 45, 46 is seated by a flexible S-ring tack-welded to the inner periphery of flange 40c, and similar in construction and function to ring 47. At its right-hand edge, shroud 42a is sealed to the adjacent edge of an exhaust casing wall 71 by a thin flexible annular bridge ring 72, which may be welded to wall 71 and projects freely into a circumferential groove in the adjacent face of the shroud blocks 42a.

While the thin supporting walls 19, 24 for the nozzle ring assembly and walls 45, 56 of the interstage casing have been described as being "flexible" in the radial direction, it is desired to call attention to the fact that these walls are not perhaps flexible in the ordinary sense of the word. As described above, these walls are of very thin section and considerable axial length, so as to present a high resistance path for the flow of heat by conduction from the hot parts to the comparatively cooler main frame parts. Because of their thin cross section, it appears in the drawings that they would be flexible in a radial direction. However it must be remembered that each of these walls is a continuous annular member, which is comparatively rigid in the sense that if one end of the ring member were held fixed, it would strongly resist any force tending to move the other end portion transversely, in a plane parallel to the first end portion. In other words, these annular wall members are rigid in the sense that they tend to maintain their respective end portions exactly coaxial. However, when one end of these ring members is strongly heated, as by conduction from a hot member to which the ring is connected, there will be a rather steep temperature gradient established along the axial length of the ring, by reason of the high resistance of the heat conduction path. Furthermore the opposite end of the ring, for instance the flanged right-hand end of wall 24, will be maintained cool by its intimate contact with the comparatively cool supporting member to which it is attached. Accordingly, the free end of these thin walled rings tends to expand radially much more than the cooler fixed end of the ring. The ring is "flexible" in the sense that it readily permits this type of differential thermal expansion without creating excessive stresses in the ring or imposing excessive stresses on associated parts. However, as described above, the ring rigidly maintains its end portions coaxial. This is important for it is obviously necessary to keep the nozzle ring assemblies exactly coaxial with the respective bucket-wheels, in order to preserve the thermodynamic efficiency of the turbine and prevent mechanical interferences.

For cooling and sealing the interstage casing assembly, cooling air is supplied by means of a conduit 73 to the annular chamber 44 in casing 40, thence through a plurality of circumferentially spaced conduits 74, one of which projects radially inward through each of the hollow nozzle blades 67 discharging into the cooling air passage 59. A plurality of circumferentially spaced passages 75 delivers cooling air from chamber 59 to an intermediate portion of the labyrinth seal 60. It wil be observed that the point at which passage 75 enters the labyrinth seal is closer to the left-hand side of the seal than to the right-hand side. This is because there is an appreciable pressure drop across the nozzle diaphragm blades 67, which means that the pressure in the space adjacent the web 8 of the first-stage wheel is appreciably higher than that obtaining adjacent the web of the second-stage wheel 11. By causing the cooling air conduit 75 to discharge into the seal closer to the high-pressure side, the flow of cooling air leftward into the space adjacent bucket-wheel 8 can be made substantially equal to the flow which passes from passage 75 to the right into the space adjacent wheel 11.

That cooling air which flows leftward, leaks past the sealing rings 63, 64, producing a cooling effect on the wheel web 8 and rim portion 9. This cooling air is discharged in the manner indicated by arrow 76 into the motive fluid flow path. That cooling air which flows from the passages 75 to the right through labyrinth seal 60 passes radially outward along the adjacent face of bucket-wheel 11 and is discharged in the manner of the arrow 77 into the motive fluid flow path.

It will be seen from the above that comparatively high-pressure air admitted through conduit 73 is caused to cool the labyrinth seal member 60 so that its desirably close clearances with the rotor may be maintained, this air also serving to cool the adjacent faces of both the first and second stage bucket-wheels.

The method of cooling the upstream side of the first-stage wheel 8 is effected by supplying cooling air under pressure from manifolds (not shown) to the annular space labeled 78 in Fig. 1. From this annular chamber, cooling air flows in the direction indicated by the arrow 79 radially outward along the web 8 of the first-stage wheel past the sealing rings 16a, 26, 27 carried by plates 16, 25 and into the motive fluid flow path as indicated by the arrow in Fig. 1.

While a particular embodiment of the invention has been illustrated and described, it will be obvious to those familiar with the art that various changes and modifications may be made without departing from the invention; and it is intended to cover in the appended claims all such changes and modifications as come within the true spirit and scope of the invention.

What I claim is:

1. In a high temperature turbine having an axial flow bucket-wheel with a circumferential row of buckets, the combination of a main frame including a nozzle support ring coaxial with the bucket-wheel and a main frame ring surrounding the bucket-wheel and radially spaced therefrom, a nozzle ring assembly adapted to supply motive fluid to the buckets and including an inner ring member connected to the nozzle support ring by a thin axially extending portion having appreciable flexibility in a radial direction, an outer ring member, and a plurality of circumferentially spaced nozzle blades engaging said outer and inner nozzle ring members, means supporting the outer ring from the main frame ring including a thin annular member having one end portion secured to the inlet portion of the outer nozzle ring and a second end portion secured to the main frame ring substantially in the plane of the bucket-wheel, stationary shroud means for the buckets including a circumferential row of separate shroud segments, means securing the shroud segments to the main frame ring, each of said segments being separated from the ends of adjacent segments by a small clearance space when cold whereby differential thermal expansion between the segments and the main frame ring may take place when heated, said segments defining a circumferential inner surface forming a small radial clearance with the tips of the buckets, the discharge edge of said outer nozzle ring and the inlet edge of said shroud segments being provided with axially spaced parallel arcuate grooves, and a plurality of bridge segments having end portions pivotally engaging said respective grooves, the circumferential length of the bridge segments corresponding to that of the shroud segments, whereby differential thermal expansion between the nozzle ring assembly and the shroud segment assembly may freely take place, a sealing plate assembly secured to said nozzle support ring and having an outer circumferential edge loosely sealed to the inner nozzle ring and a plurality of sealing ring members having concentric annular edge portions forming close clearances with the adjacent face of the bucket-wheel rim, and means for cooling the main frame ring to minimize changes in the radial dimensions thereof during operation.

2. In a high-temperature turbine, a nozzle ring assembly comprising inner and outer axially extending radially spaced concentric annular walls defining a flow path for high-temperature fluid, a plurality of circumferentially spaced nozzle partitions extending radially across the flow path and engaging said annular walls, a main support ring member arranged concentric with the nozzle walls and axially spaced from the plane of the partitions, an annular sealing plate assembly arranged concentrically within and radially spaced from the inner nozzle ring wall, a first annular supporting wall having an axial length at least equal to the axial length of the outer nozzle ring wall and surrounding and radially spaced therefrom, said supporting wall having a first end portion secured to the outer main frame ring and a second end portion secured to the remote end of the outer nozzle ring wall, said first supporting wall being of comparatively thin cross-section so as to offer high resistance to the flow of heat by conduction from the outer nozzle ring to the main frame ring and to permit free relative thermal expansion between the respective end portions of the support wall, a second annular support wall arranged within and radially spaced from the inner nozzle ring wall and having a first end portion secured to the outer circumference of said sealing plate assembly substantially at the plane of one end portion of the inner nozzle ring wall, said second support wall being also of thin cross section and having a second end portion secured to the other end of the inner nozzle ring wall, a second sealing plate assembly secured to said first sealing plate assembly and having an outer circumference loosely sealed to the adjacent end of the inner nozzle ring wall whereby hot motive fluid is prevented from circulating into the annular space defined between the second support wall and the inner nozzle ring wall while the latter is free to expand and contract relative to the second sealing plate assembly, and other flexible means bridging the space between the outer main frame ring and the adjacent end of the outer nozzle ring wall whereby differential thermal expansion is freely permitted therebetween while preventing the entrance of hot motive fluid into the space defined between the first support wall and the outer nozzle ring wall.

3. In a high temperature turbine having an axial flow bucket-wheel with a circumferential row of buckets, the combination of a main frame including a nozzle support ring coaxial with the bucket wheel at the inlet side thereof and a main frame ring surrounding the bucket wheel and supported in radially spaced relation to the nozzle support ring, a nozzle ring assembly adapted to supply motive fluid to the buckets and including an inner ring member connected to the nozzle support ring by a thin axially extending portion, an outer ring member, and a plurality of circumferentially spaced nozzle blades engaging said outer and inner nozzle ring members, means supporting the outer ring from the main frame ring including a thin annular member of substantial axial length having one end portion secured to the inlet portion of the outer nozzle ring and a second end portion secured to the main frame ring substantially in the plane of the bucket-wheel, stationary shroud means for the buckets including a circumferential row of separate shroud segments, means securing the respective shroud segments in fixed relation to the main frame ring, each of said segments being separatd from the ends of adjacent segments by a small clearance space when cold whereby differential thermal expansion between the segments and the main frame ring may take place in a circumferential direction when heated, said segments defining a circumferential inner surface forming a small radial clearance with the tips of the buckets, and means for cooling the main frame ring whereby the diameter of the inner circumferential surface defined by the shroud segments does not change appreciably during normal operation.

4. In a high temperature turbine having an axial flow bucket-wheel with a circumferential row of buckets, the combination of a main frame including a nozzle support ring coaxial with the bucket-wheel and a main frame ring surrounding the bucket-wheel and supported in radially spaced relation to the wheel, a nozzle ring assembly adapted to supply motive fluid to the buckets and including an inner ring member connected to the nozzle support ring by a thin axially extending portion, an outer ring member, and a plurality of circumferentially spaced nozzle blades engaging said outer and inner nozzle ring members, means supporting the outer ring from the main frame ring including a thin annular member of substantial axial length with one end portion secured to the inlet portion of the outer nozzle ring and a second end portion secured to the main frame ring substantially in the plane of the bucket-wheel, stationary shroud means for the buckets including a circumferential row of separate shroud segments, means holding the respective shroud segments in fixed relation to the main frame ring, each of said segments being separated from the ends of adjacent segments by a small clearance space when cold whereby differential thermal expansion between the segments and the main frame ring may take place in a circumferential direction when heated, said segments defining a circumferential inner surface forming a small radial clearance with the tips of the buckets, and means for cooling the main frame ring whereby the diameter of the inner circumferential surface defined by the shroud segments does not change appreciably during normal operation, and a sealing plate assembly secured to the nozzle support ring and having an outer circumferential edge loosely sealed to the inner nozzle ring and a plurality of sealing ring members having concentric annular edge portions forming close clearances with the adjacent face of the bucket wheel rim.

ALAN HOWARD.

REFERENCES CITED

The following references are of record in the file of this patent:

UNITED STATES PATENTS

| Number | Name | Date |
|---|---|---|
| 1,378,464 | Junggren | May 17, 1921 |
| 2,427,244 | Warner | Sept. 9, 1947 |
| 2,432,315 | Howard | Dec. 9, 1947 |
| 2,488,875 | Morley | Nov. 22, 1949 |
| 2,527,445 | Pentheny | Oct. 24, 1950 |
| 2,564,503 | Rice | Aug. 14, 1951 |

FOREIGN PATENTS

| Number | Country | Date |
|---|---|---|
| 687,108 | Germany | Jan. 23, 1940 |
| 696,062 | Germany | Sept. 10, 1940 |